(12) United States Patent
Kim et al.

(10) Patent No.: US 7,801,889 B2
(45) Date of Patent: Sep. 21, 2010

(54) SEARCH SYSTEM FOR PROVIDING INFORMATION OF KEYWORD INPUT FREQUENCY BY CATEGORY AND METHOD THEREOF

(75) Inventors: Dong Hoi Kim, Seoul (KR); Seung Hyun Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 37 days.

(21) Appl. No.: 10/596,476

(22) PCT Filed: Dec. 22, 2004

(86) PCT No.: PCT/KR2004/003390

§ 371 (c)(1),
(2), (4) Date: Jun. 14, 2006

(87) PCT Pub. No.: WO2005/062208

PCT Pub. Date: Jul. 7, 2005

(65) Prior Publication Data

US 2007/0130139 A1 Jun. 7, 2007

(30) Foreign Application Priority Data

Dec. 22, 2003 (KR) ...................... 10-2003-0094816

(51) Int. Cl.
*G06F 17/30* (2006.01)
(52) U.S. Cl. ...................... 707/731; 707/722; 707/723; 707/727
(58) Field of Classification Search ........................ None
See application file for complete search history.

(56) References Cited

U.S. PATENT DOCUMENTS

| 6,366,910 | B1* | 4/2002 | Rajaraman et al. ............. 707/5 |
| 6,697,799 | B1* | 2/2004 | Neal et al. ...................... 707/3 |
| 6,785,671 | B1* | 8/2004 | Bailey et al. ........................ 1/1 |
| 6,795,825 | B2* | 9/2004 | Rishe ........................... 707/10 |
| 6,859,807 | B1* | 2/2005 | Knight et al. ....................... 1/1 |
| 6,963,867 | B2* | 11/2005 | Ford et al. ...................... 707/3 |
| 6,978,264 | B2* | 12/2005 | Chandrasekar et al. ......... 707/3 |
| 7,146,416 | B1* | 12/2006 | Yoo et al. .................... 709/224 |
| 7,152,064 | B2* | 12/2006 | Bourdoncle et al. ............ 707/5 |
| 7,289,985 | B2* | 10/2007 | Zeng et al. .................. 707/749 |
| 7,305,415 | B2* | 12/2007 | Vernau et al. ............ 707/103 Z |
| 7,401,072 | B2* | 7/2008 | Piscitello et al. ............... 707/3 |
| 7,447,678 | B2* | 11/2008 | Taylor et al. ................... 707/3 |

(Continued)

FOREIGN PATENT DOCUMENTS

KR   2002-0003915   1/2002

OTHER PUBLICATIONS

PCT International Search Report, Mar. 29, 2005.

(Continued)

*Primary Examiner*—Tim T. Vo
*Assistant Examiner*—Michelle Owyang
(74) *Attorney, Agent, or Firm*—H.C. Park & Associates, PLC

(57) ABSTRACT

The present invention relates to a search service system and a method thereof, and more particularly, relates to a search service system capable of providing an input order of a keyword which is input into the search service system, according to a category to which the keyword belongs, and a method thereof.

11 Claims, 9 Drawing Sheets

U.S. PATENT DOCUMENTS

| | | |
|---|---|---|
| 2001/0042064 A1 | 11/2001 | Davis |
| 2002/0174110 A1* | 11/2002 | Smith .............................. 707/3 |
| 2003/0004781 A1* | 1/2003 | Mallon et al. .................. 705/10 |
| 2003/0014403 A1* | 1/2003 | Chandrasekar et al. ......... 707/5 |
| 2003/0055816 A1 | 3/2003 | Paine et al. |
| 2003/0055819 A1* | 3/2003 | Saito et al. ...................... 707/3 |
| 2003/0061219 A1* | 3/2003 | Monteverde ................. 707/10 |
| 2003/0088553 A1* | 5/2003 | Monteverde ................... 707/3 |
| 2003/0195901 A1* | 10/2003 | Shin et al. ................ 707/104.1 |
| 2005/0080773 A1* | 4/2005 | Koike et al. ..................... 707/3 |

OTHER PUBLICATIONS

PCT Written Opinion of the ISA, Mar. 29, 2005.

* cited by examiner

US 7,801,889 B2

SEARCH SYSTEM FOR PROVIDING INFORMATION OF KEYWORD INPUT FREQUENCY BY CATEGORY AND METHOD THEREOF

CROSS REFERENCE TO RELATED APPLICATIONS

This application claims the benefit of PCT Application No. PCT/KR2004/003390 filed Dec. 22, 2004, which claims the benefit of priority from Korean Patent Application No. 10-2003-0094816 filed on Dec. 22, 2003. The disclosures of International Application PCT Application No. PCT/KR2004/003390 and Korean Patent Application No. 10-2003-0094816 are incorporated herein by reference.

TECHNICAL FIELD

The present invention relates to a search service system and a method thereof, and more particularly, relates to a search service system capable of providing a popularity rank of a keyword which is input into the search service system, according to a category to which the keyword belongs, and a method thereof.

BACKGROUND ART

The most general search service method provided by a search service system is a keyword search service. In case that a keyword is input from a user, the search service system, which provides the keyword search service, provides the user with search results including the keyword (e.g., a web site including the keyword, an article including the keyword, an image with a file name including the keyword, etc).

At this time, the search service system according to the prior art further provides a service of notifying a user of 'a popular search word'. A drawing symbol 101 of FIG. 1 illustrates one example of popular search words provided for the user, in the search service system according to the prior art.

However, the service of providing popular search words according to the prior art is configured to display several popular search words whose frequency ranks high, on a web page or the like, by using the number of keywords input by users per certain period. Thus, there is a problem that it is impossible to provide users with popular search words in real time.

Furthermore, the service of providing popular search words according to the prior art is configured to determine and provide popular search words by using only the number of input keywords, without classifying keywords by categories. Thus, there is a problem that what kind of keyword a user inputs, the user has no choice but to be provided with the same popular keywords such as a singer (Kyoo-chan Cho), a drama (Lady Han), a movie (Ocean's twelve) and the like, as illustrated in FIG. 1.

Furthermore, the service of providing popular search words according to the prior art neither compute how popular each of popular search words is, nor provide the computed results. Thus, there is a limit that users cannot know which popular search word among popular search words is more popular.

Furthermore, in the service of providing popular search words according to the prior art, in case that the keyword input by a user is not a popular search word, there is a problem that the user cannot know how much interest other users have in an issue associated with the keyword input by oneself.

DISCLOSURE OF THE INVENTION

Technical Questions

Figure 1:
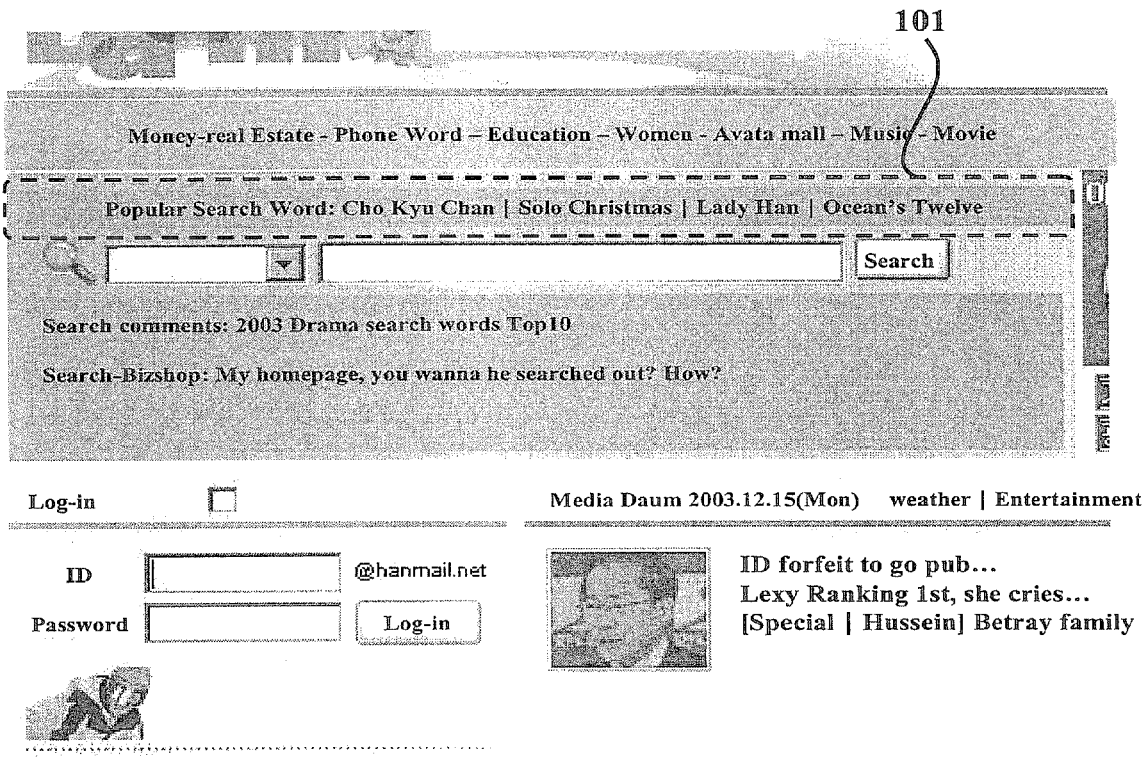
FIG. 1 is a drawing illustrating one example of popular search words provided for a user by a search service system according to the prior art.

The present invention is conceived to solve the aforementioned problems in the prior art, one object of the present invention is to provide search service system and method which can provide popularity ranks of keywords, by categories of keywords used in the prior searches.

Furthermore, other object of the present invention is to provide search service system and method which can further provide other keywords associated with a category associated with a keyword input in the search service system, and a popularity rank of each of the keywords.

Furthermore, another object of the present invention is to provide search service system and method which, based on the latest interests of users who input keywords, can compute and provide popularity ranks of keywords, by classifying categories associated with the keyword into a representative category and a general category and by enabling the representative category and the general category to be changeable.

Furthermore, another object of the present invention is to provide search service system and method which can include keywords having similar or same meaning in one group of keywords, and in case that an input keyword is associated with the keyword group, compute and provide a popularity rank of keywords compatible with a user's intention by increasing the number of input keywords associated with the keyword group.

Technical Solutions

In order to achieve the aforementioned objects and solve the problems in the prior art, a search service system according to the present invention comprises a category classification database including at least one classification record, wherein the classification record comprises a representative category associated with a predetermined keyword group and a general category associated therewith; a keyword database maintaining a predetermined keyword group and data indicative of the number of searches made using the keywords corresponding thereto, wherein the keyword group comprises a representative keyword or a keyword having the same or similar meaning thereto; an input unit for receiving a keyword from a user through a communication network; a first search unit for searching the category classification database for a representative category associated with a first keyword group including the received keyword, and determining a second keyword group associated with the searched representative category, wherein the second keyword group includes the first keyword group; a second search unit for searching the keyword database for the second keyword group and data regarding the number of searched keywords corresponding thereto; a popularity rank computing unit for computing a popularity rank within the searched representative category of the first keyword group by using the second keyword group and data regarding the number of searched keywords corresponding thereto; an output unit for providing the user with the computed popularity rank through the communication network, in association with the searched representative category and a representative keyword of the first keyword group; and a updating unit for updating data indicative of the number of searched keywords corresponding to the first keyword group, in the keyword database, in response to the input of the keyword.

According to one aspect of the present invention, the search service system further comprises a management unit for: receiving a selection of a representative category associated with a predetermined keyword group or a selection of a general category related thereto, from a manager; and changing the received representative category associated with the keyword group or the received general category related thereto in the classification record.

Furthermore, according to other aspect of the present invention, the popularity rank computing unit respectively computes a second popularity rank of the second keyword group within the representative category, based on the second keyword group and data indicative of the number of searches made using the keywords corresponding thereto.

Furthermore, according to another aspect of the present invention, the output unit provides the user with the second popularity rank through the communication network, in association with the searched representative category and a representative keyword of the second keyword group.

BEST MODE FOR CARRYING OUT THE INVENTION

Hereinafter, the present invention will be in detail described with reference to the accompanying drawings.

Figure 2:
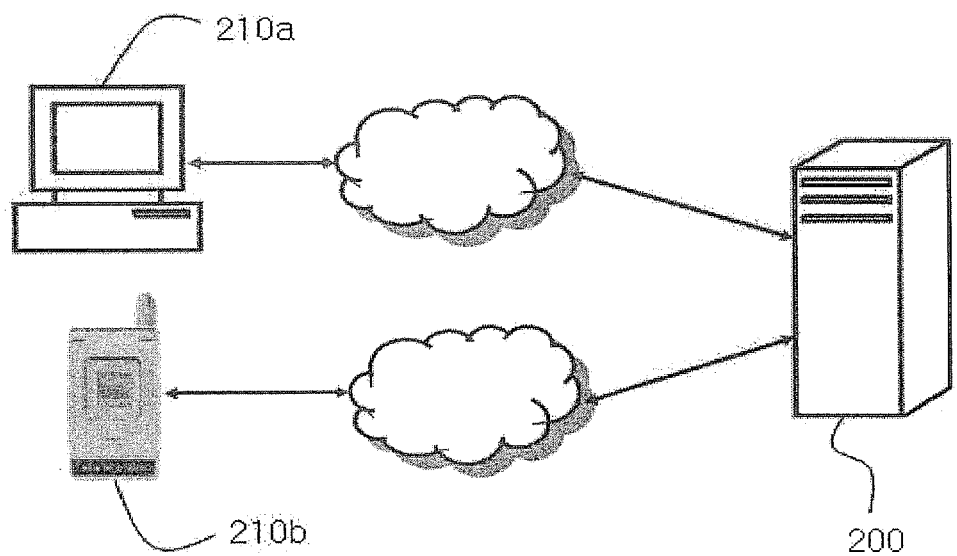
FIG. 2 is a drawing illustrating a network connection of a search service system according to one embodiment of the present invention.

FIG. 2 is a drawing illustrating a network connection of a search service system according to one embodiment of the present invention. Users access a search service system 200 through wired/wireless communication network by using a user terminal 210a or 210b, and input a keyword. The search service system 200 transmits a keyword search result corresponding to the keyword, to the user terminal 210a or 210b. Moreover, the search service system 200 according to the present invention further transmits a popularity rank of the input keyword by category, to the user terminal 210a or 210b.

Figure 3:
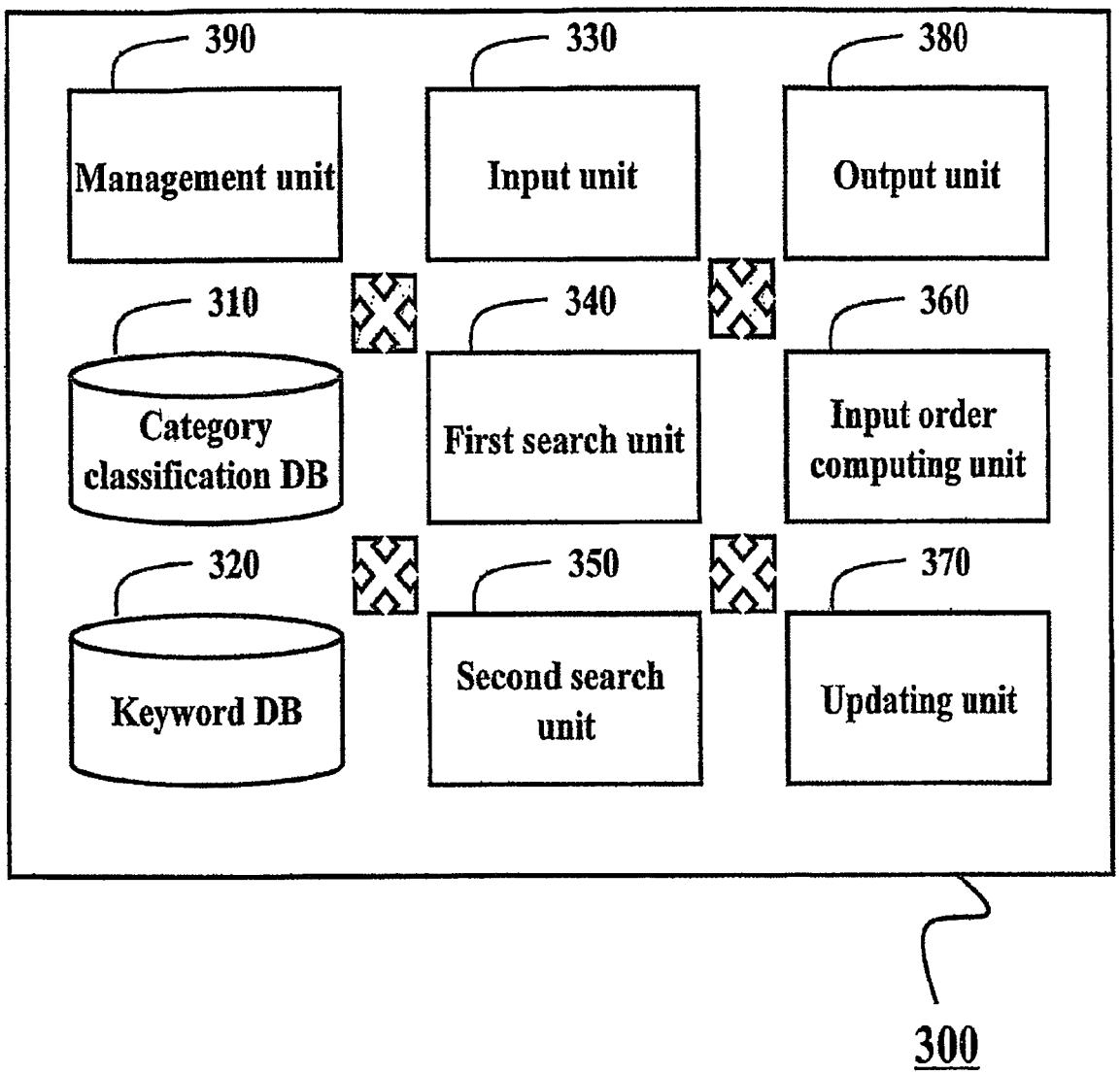
FIG. 3 is an internal block diagram illustrating configuration of a search service system according to one embodiment of the present invention.

FIG. 3 is an internal block diagram illustrating configuration of the search service system 200 according to one embodiment of the present invention. A search service system 300 comprises a category classification database 310, a keyword database 320, an input unit 330, a first search unit 340, a second search unit 350, a popularity rank computing unit 360, an updating unit 370, an output unit 380 and a management unit 390.

The term "a keyword group" used in the present specification means a group comprising one representative keyword and a keyword having the same/similar meaning thereto, wherein the term of "the representative keyword" means a keyword provided to a user from keywords comprised in the keyword group, together with a popularity rank.

Furthermore, the team "a first keyword group" used in the present specification means a keyword group including a keyword input from a user, among keyword groups. The term "a second keyword group" means a keyword group whose (representative) category is the same as that of the first keyword group, among keyword groups. Therefore, the second keyword group includes the first keyword group.

In addition, the term "a second popularity rank" used in the present specification means a popularity rank of the second keyword group within the (representative) category.

Figure 4A:
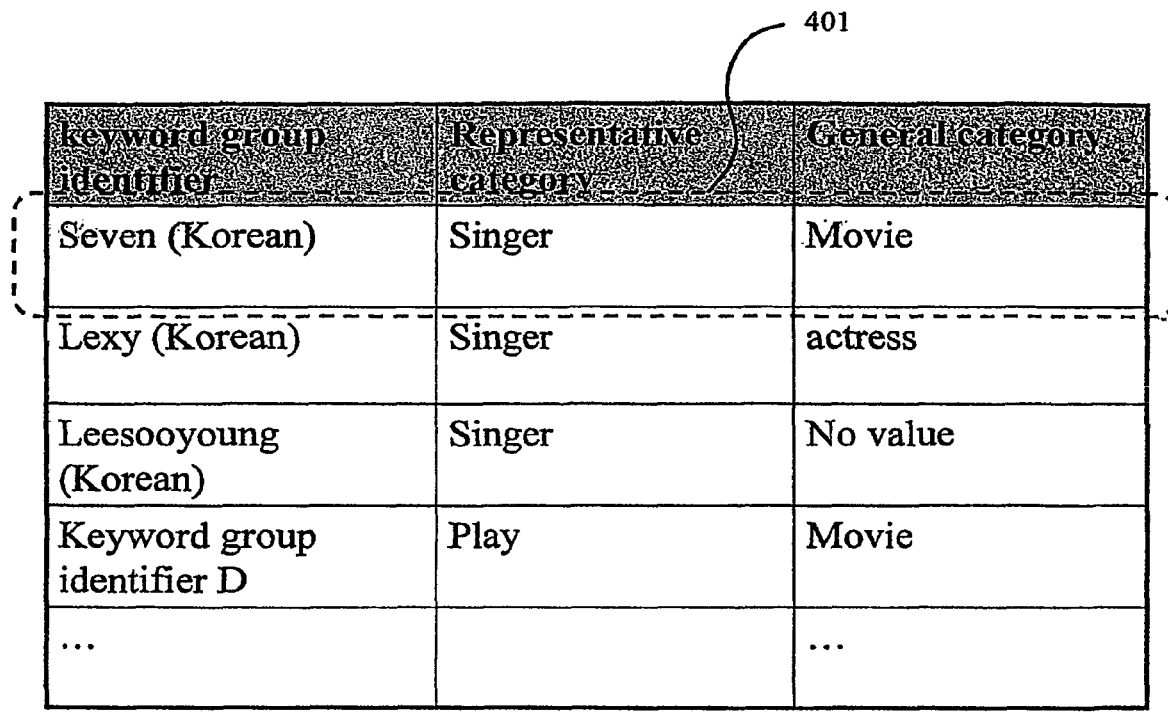
FIG. 4a is drawing illustrating one example of classification record maintained in a category classification database, in one embodiment of the present invention.

The category classification database 310 includes at least one classification record as indicated by a drawing symbol 401 in FIG. 4a. The classification record 401 comprises at least one representative category associated with a predetermined keyword group and at least one general category associated therewith. At this time, a keyword group identifier may be used to identify the keyword group. In the present embodiment, as for an example, the representative keyword included in the keyword group is used as an identifier thereof, which is illustrated in FIG. 4a. This is for convenient understanding. In addition, although there may be a plurality of keyword groups associated with one representative category, in the present embodiment, as for an example, there is only one keyword group having representative keywords 'seven', 'lexy' and 'leesooyoung' respectively, as a keyword group associated with a representative category 'singer, as illustrated in FIG. 4a.

According to one embodiment of the present invention, the search service system 300 includes the management unit 390 for managing the category classification database 310. The management unit 310 receives a selection of a representative category associated with a predetermined keyword group or a selection of a general category related thereto, from a manager; and changes the received representative category associated with the keyword group or the received general category related thereto in the classification record. For example, the representative category for the keyword 'seven' may formerly have been 'movie'. However, in this case it was determined that users searched the keyword 'seven' in order to search for a singer 'seven', not a movie titled by 'seven', and so the manager inputs a selection of 'singer' for the representative category and a selection of 'movie' for the general category, in association with the keyword group including the keyword 'seven'. The management unit 390 enables the classification record 401 as illustrated in FIG. 4a to be maintained, based on the selection of the representative category and the selection of the general category inputted in association with the keyword group including the keyword 'seven'. Namely, it is possible to change the representative category or general category included in at least one classification record which is maintained in the category classification database 310.

According to the above configuration, "since a popularity rank is computed only in association with the representative category", the search service system 300 is enabled to compute a popularity rank of a keyword in correspondence with a user's intention. Namely, since concepts of the representative category and the general category are used, for users who search the keyword 'seven' to search for the singer 'seven', it is possible to prevent the unexpected movie 'seven' of the movie category from ranking high in a popularity rank of the keyword.

Therefore, the keyword 'seven' is currently associate with the singer 'seven', but if the social climate surrounding the term 'seven' changes, for example, such that 'seven' becomes a drama and user's interests thereon go up, and it is determined that users search the keyword 'seven' to search for the drama 'seven', the management unit 390 changes the representative category associated with the keyword 'seven' into 'a drama' and the general category into 'a singer'. Thus, a popularity rank of a keyword corresponding to a user's intention can be computed.

Figure 4B:
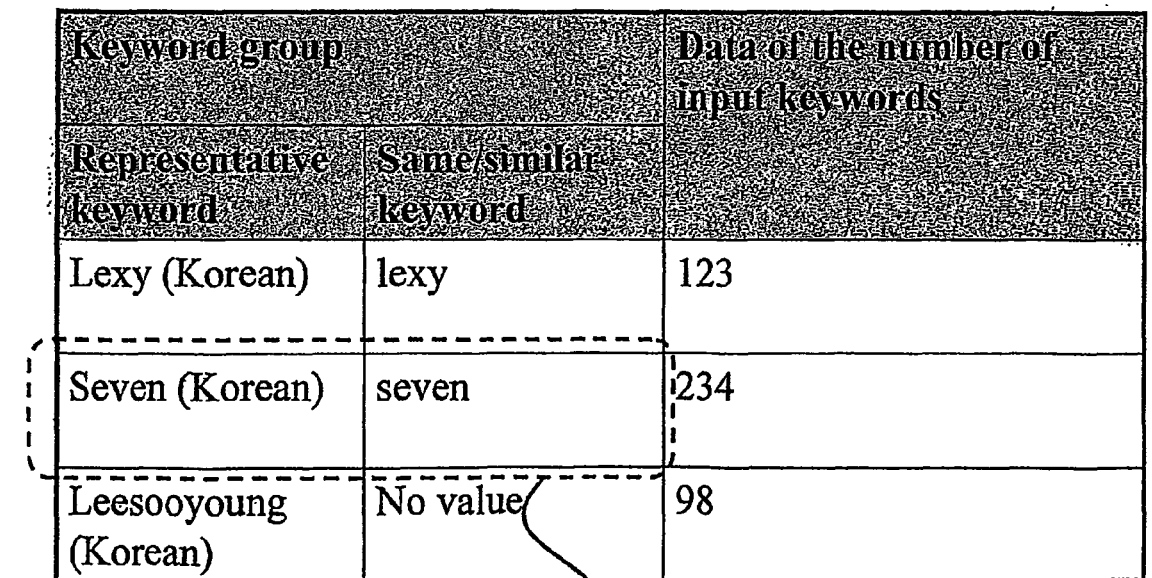
FIG. 4b is a drawing illustrating one example of a predetermined group of keywords maintained in a keyword database and data of the number of input keywords corresponding thereto, in one embodiment of the present invention.

The keyword database 320 maintains a predetermined keyword group and data indicative of the number of previously searched keywords corresponding thereto, as illustrated in FIG. 4b. A keyword group includes a representative keyword and at least one keyword having the same/similar meaning thereto. For example, as indicated by a drawing symbol 402, the representative keyword is 'seven (Korean)', the keyword having the same/similar meaning to 'seven (Korean)' is 'seven', and 'seven (Korean)' and 'seven' are included in one keyword group.

The search service system 300 according to the present embodiment is intended to compute a popularity rank of a keyword corresponding to a user's intent by using a concept of a keyword group including at least one keyword. For example, in case that users want to search for the singer 'seven', they often search 'seven (in Korean)' or 'seven' as a keyword. At this time, the keyword 'seven (Korean)' and 'seven' are used for the same target. Therefore, in case that a popularity rank is computed based on the number of searches corresponding to each of keywords 'seven (Korean)' and 'seven', unlike users' intention, there may be an event that their interests with respect to the singer 'seven' might be depreciated. For example, in case that the keyword 'leehyori' was previously searched 300 times, that of keyword 'seven (Korean)' is 280 and that of keyword 'seven' is 50, the total number of previously searched keywords with respect to the signer 'seven' is "280 (seven (Korean))+50 (seven)=330". However, since a popularity rank with respect to the keyword 'leehyori' is computed higher than either 'seven (Korean)' or 'seven' individually, there is a concern that a popularity rank not corresponding to a user's intention, might be computed, such that users might think that people are more interested in the singer 'leehyori' rather than the singer 'seven'. Therefore, in case that the keyword 'seven (Korean)' is searched and in case that the keyword 'seven' is searched, in order to compute the number of searches by adding up the two cases, the search service system according to the present invention is configured to comprise a representative keyword (seven (Korean)) and a keyword (seven) having the same/similar meaning thereto, as one keyword group.

The input unit 330 receives a keyword from the user terminal 210a or 210b, through the communication network. For example, the received keyword is 'seven'. A keyword group including the received keyword 'seven' is a first keyword group. In the present embodiment, the representative keyword 'seven (Korean)' of the first keyword group is used as an identifier of the first keyword group.

The first search unit 340 searches the category classification database 310 for the representative category associated with the first keyword group. A 'singer' is searched as the representative category associated with 'seven (Korean)', the identifier of the first keyword group, from the classification record.

Moreover, the first search unit 340 determines a second keyword group associated with the searched representative category 'singer' by referring to the category classification database 310. A keyword group associated with the searched representative category 'singer' (i.e., keyword groups whose representative keywords are 'seven (Korean)', 'lexy' and 'leesooyoung') is the second keyword group.

The second search unit 350 searches the keyword database 320 for the second keyword group and data indicative of the number of searched keywords corresponding thereto. Namely, '123', data indicative of the number of searched keywords associated with the second keyword group 'lexy'; '234', data indicative of the number of searched keywords associated with the second keyword group 'seven (Korean)'; and '98', data indicative of the number of searched keywords associated with the second keyword group 'leesooyoung' are respectively searched.

The popularity rank computing unit 360 computes a popularity rank of the first keyword group by using the second keyword group and data of the number of previously searched keywords corresponding thereto which are searched like above. The number of the searched keywords are in order of the second keyword group 'seven (Korean)', the second keyword group 'lexy' and the second keyword group 'leesooyoung'. Thus, the popularity rank of the first keyword group 'seven (Korean)' is 1st.

As aforementioned, according to the present embodiment, since a popularity rank of the first keyword group is computed from the second keyword group associated with a representative category, the popularity rank is computed by category.

Figure 5A:
FIGS. 5a to 5d are drawings illustrating examples of a popularity rank provided for a user terminal by a search service system according to each embodiment of the present invention.

The output unit 370 provides the user terminal 210a or 210b with the computed popularity rank, in association with the representative category 'singer' and the representative keyword 'seven (Korean)' of the first keyword group. FIG. 5a is a drawing illustrating one example of a popularity rank provided for the user terminal 210a or 210b, according to the configuration like above. As indicated by a drawing symbol 501 in FIG. 5a, in case that a user searches 'seven' in the search service system 300, the search service system 300, with respect to the keyword 'seven', further provides a popularity rank in association with the representative category 'singer' and the representative keyword 'seven (Korean)' of the first keyword group, as indicated by a drawing symbol 502, together with keyword search results.

In addition, according to another embodiment of the present invention, the popularity rank computing unit 360 respectively computes second popularity ranks of the second keyword group, based on the second keyword group and data indicative of the number of searched keywords corresponding thereto. In the present embodiment, second popularity ranks are respectively computed in such a way that the second keyword group 'lexy' is 2nd, the second keyword group 'seven (Korean)' is 1st, and the second keyword group 'leesooyoung' is 3rd.

Figure 5B:

The output unit 380 provides the user terminal 210a or 210b with the second popularity rank, in association with the representative category 'singer' and a representative keyword of the second keyword group. FIG. 5b is a drawing illustrating one example of the second popularity rank provided for the user terminal 210a or 210b according to the present embodiment. According to the present embodiment, in case that the keyword 'seven' searched by a user belongs to the category 'singer', popularity ranks of other keyword groups associated with the category 'singer' are also provided as indicated by drawing symbol 520. A drawing symbol 521 means each second popularity rank and a drawing symbol 522 means a representative keyword of each second keyword group.

In addition, according to another embodiment of the present invention, the output unit 380 selects the predetermined number of second keyword groups whose second popularity ranks rank high, and provides a user with only second popularity rank associated with the selected second keyword group. In the aforementioned embodiment, there is described that second keyword groups are only three. However, generally, there exists a plurality of second keyword groups associated with one representative category. At this time, in case that all the popularity ranks associated with second keyword groups are provided for a user, too much information is unnecessarily provided, which might offend the user. Accordingly, the search service system 300 according to the present embodiment provides the predetermined number of second keyword groups whose second popularity rank high, from second keyword groups associated with a representative category. For example, the search service system 300 selects 10 groups of second keyword groups whose popularity ranks are within top ten, and provides the second popularity ranks thereof.

Figure 5C:

FIG. 5c is a drawing illustrating one example of providing second popularity ranks of second keyword groups whose second popularity ranks are within top ten, in case that there are a plurality of second keyword groups associated with the representative category. Like the aforementioned embodiment, the second popularity rank may be provided in association with the representative category, the representative keyword of the second keyword and the fluctuation band thereof.

Figure 5D:

In the meantime, in case that a popularity rank of the first keyword group is out of top ten among the second popularity ranks, the search service system 300 provides second popularity ranks of second keyword groups to top ten, separately from the popularity rank of the first keyword group. FIG. 5d is a drawing illustrating one example of popularity ranks provided for the user terminal 210a or 210b, in case that a popularity rank of a first keyword group is out of top ten. Namely, in case that the popularity rank of the first keyword group associated with the keyword 'seven' searched by a user ranks 53rd among second keyword groups associated with the representative category 'singer', the popularity rank associated with the first keyword group and second popularity ranks of second keyword groups which are within top ten among the second keyword groups are respectively provided for the user.

The updating unit 370 updates data of the number of searched keywords associated with the first keyword group of the keyword database 320, in response to searching of the keyword 'seven'. Namely, the updating unit 370 updates '234', data indicative of the number of searched keywords associated with the first keyword group including the keyword 'seven', to '235'. Based on setting of the search service system 300, the updating unit 370 may update data indicative of the number of searched keywords before or after computing the popularity rank.

Furthermore, according to another embodiment of the present invention, the search service system 300 provides popularity ranks by time period with respect to keywords. The keyword database 320 maintains data indicative of the number of searched keywords by time period corresponding to a predetermined keyword group. The updating unit 370 resets the data indicative of the number of searched keywords by time period, to 0 periodically. The cycle may be a time period set by a manager.

Like above, since the updating unit 370 updates data of the number of searched keywords to 0, according to the time period, the popularity ranks computed by the popularity rank computing unit 360 are ones by time period. According to the present embodiment, the user provided with popularity ranks by time period can know the latest main issue in a field associated with the representative category.

Furthermore, according to another embodiment of the present invention, the keyword database 320 may maintain both the non-temporal data indicative of the number of searched keywords and data indicative of the number of searched keywords by time period. At this time, the popularity rank computing unit 360 may compute the non-temporal popularity ranks and popularity ranks by time period by respectively using the non-temporal data indicative of the number of searched keywords and the data indicative of the number of search keywords by time period. The output unit 380 may provide a user with the computed non-temporal popularity ranks and popularity ranks by time period.

Furthermore, according to another embodiment of the present invention, the search service system 300 further provides information on a fluctuation band of popularity rank. The search service system 300 according to the present embodiment further comprises a storage unit, a third search unit, a popularity rank band computing unit and a popularity rank updating unit.

The storage unit stores a popularity rank of a keyword group associated with a predetermined category. The popularity rank stored in the storage unit is a popularity rank computed by the popularity rank computing unit 360, according to the keywords searched just before the user inputs the keyword.

The third search unit searches the storage unit for a popularity rank of a keyword group which corresponds to the second keyword group and is associated with the representative category. The popularity rank band computing unit computes a fluctuation band of popularity ranks of the second keyword group, by comparing the searched popularity rank with the second popularity rank of the second keyword group in the representative category. For example, in case that the popularity rank of the keyword group 'changnara', which is stored in the storage unit in association with the category 'singer', ranks 1st, and the second popularity rank, which is newly computed in such a way that a user searches a keyword associated with the category 'singer', ranks 2nd, the popularity rank-band computing unit computes '−1', the fluctuation band.

The output unit 380 provides the computed fluctuation band for the user terminal 210a or 210b in association with the second popularity rank, as indicated by a drawing symbol 523 in FIG. 5c. The popularity rank updating unit updates a popularity rank of a keyword group that corresponds to the second keyword group and is associated with the representative category 'singer', to the second popularity rank in the storage unit. At this time, this is used as data for computing a fluctuation of a second popularity rank which is newly computed by the searching of a new keyword. Among the fluctuation band indicated by a drawing symbol 523, in comparison with the last time, '+1' is used to show that the popularity rank is up by one place, '−1' is used to show that the popularity rank is down by one place, and '0' is used to show that the popularity rank has no change.

Based on the configuration like above, according to the present embodiment, a user can know a popularity rank of one's searched keyword in a predetermined (representative) category and popularity ranks of other keywords associated with the (representative) category. Together with this, the user can know of change in the popularity rank/the fluctuation band thereof. Therefore, the user can know ordinary people's interests and any change thereof.

Hereinafter, the search service system according to another embodiment of the present invention will be described with reference to FIG. 3. According to the present embodiment, the classification record maintained in the category classification database 310 includes a representative category associated with a predetermined keyword and a general category related thereto. In addition, the keyword database 320 maintains a predetermined keyword and data indicative of the number of searched keywords corresponding thereto. The input unit 330 receives a first keyword from the user terminal 210a or 210b through the communication network. The first search unit 340 searches the category classification database 310 for a representative category associated with the first keyword, and determines a second keyword associated with the searched representative category.

The second search unit 350 searches the keyword database 320 for the second keyword and data indicative of the number of searched keywords corresponding thereto.

The popularity rank computing unit 360 computes a popularity rank of the second keyword by using the second keyword and data indicative of the number of searched keywords corresponding thereto. Since the first keyword is one of the second keywords, a popularity rank of the first keyword is also computed.

The output unit 380 provides the user terminal 210a or 210b with the popularity rank of the second keyword in association with the representative category. In addition, according to another embodiment of the present invention, the output unit 380 provides only popularity rank of the predetermined number of second keywords whose popularity ranks rank high among the second keywords. At this time, in case that the first keyword is not included in the predetermined number of second keywords, the output unit 380 further provides the popularity rank of the first keyword, separately from the popularity rank of the predetermined number of the second keywords.

The updating unit 370 increases data indicative of the number of searched keywords corresponding to the first keyword group, in the keyword database 310, in response to the searching of the first keyword.

The management unit 390 receives a selection of a representative category associated with a predetermined keyword or a selection of a general category related thereto, from a manager; and changes the received representative category associated with the keyword group or the received general category associated therewith in the classification record.

Since the search service system according to the present embodiment does not adopt a concept of a keyword group, with respect to the keyword 'seven (Korean)' and the keyword 'seven', data indicative of the number of searched keywords are respectively maintained and popularity ranks thereof are also respectively computed. Otherwise, in case that data only with respect to the keyword 'seven (Korean) is maintained in the keyword database 320 and data with respect to the keyword 'seven' is not maintained therein, the popularity rank with respect to the keyword 'seven' is not computed. Accordingly, in case that a popularity rank is computed according to the present embodiment and provided for a user, a keyword most adopted by users (i.e. the keyword 'seven (Korean) rather than the keyword 'seven') is used to indicate the same target.

Hereinafter, the search service system according to another embodiment of the present invention will be described with reference to FIG. 3. According to the present embodiment, the classification record maintained in the category classification database 310 includes a category associated with a predetermined keyword group. In addition, the keyword database 320 maintains a predetermined keyword group and data indicative of the number of searched keywords corresponding thereto. The keyword group is a group including one representative keyword and a keyword having the same/similar meaning thereto.

The input unit 330 receives a keyword from the user terminal 210a or 210b through the communication network. A keyword group including the received keyword is a first keyword group.

The first search unit 340 searches the category classification database 310 for a category associated with the first keyword group, and determines a second keyword group associated with the searched category.

The second search unit 350 searches the keyword database 320 for the second keyword group and data indicative of the number of searched keywords corresponding thereto.

The popularity rank computing unit 360 computes a popularity rank of the second keyword group by using the second keyword group and data indicative of the number of searched keywords corresponding thereto. At this time, since the first keyword group is one of the second keyword groups, the popularity rank of the first keyword group is also computed.

The output unit 380 provides the user terminal 210a or 210b with the popularity rank of the second keyword group, in association with the searched category and a representative keyword included in the second keyword group. In addition, according to another embodiment of the present invention, the output unit 380 provides only popularity rank of the predetermined number of second keyword groups whose popularity ranks rank high among the second keyword groups. At this time, in case that the first keyword group is not included in the predetermined number of second keyword groups, the output unit 380 provides the popularity rank of the first keyword group, separately from the popularity rank of the predetermined number of second keywords.

The updating unit 370 increases data of the number of searched keywords corresponding to the first keyword group including the keyword, in the keyword database 310, in response to the searching of the keyword.

According to the present embodiment, since concepts of representative category/general category are not adopted, in case that a popularity rank corresponding to the first keyword group is computed, a popularity rank of the first keyword group in all the categories associated therewith is computed. Therefore, in case that there are a plurality of categories associated with the first keyword group, according to the embodiment, the output unit 380 may respectively compute popularity ranks of both the first keyword group and the second keyword group for each of said plurality of the categories and respectively provide the computed popularity ranks, or may select the predetermined number of categories from said plurality of the categories based on a predetermined criterion and compute popularity ranks of the first group and the second group for each of the selected category and provide the computed popularity ranks.

Figure 6:
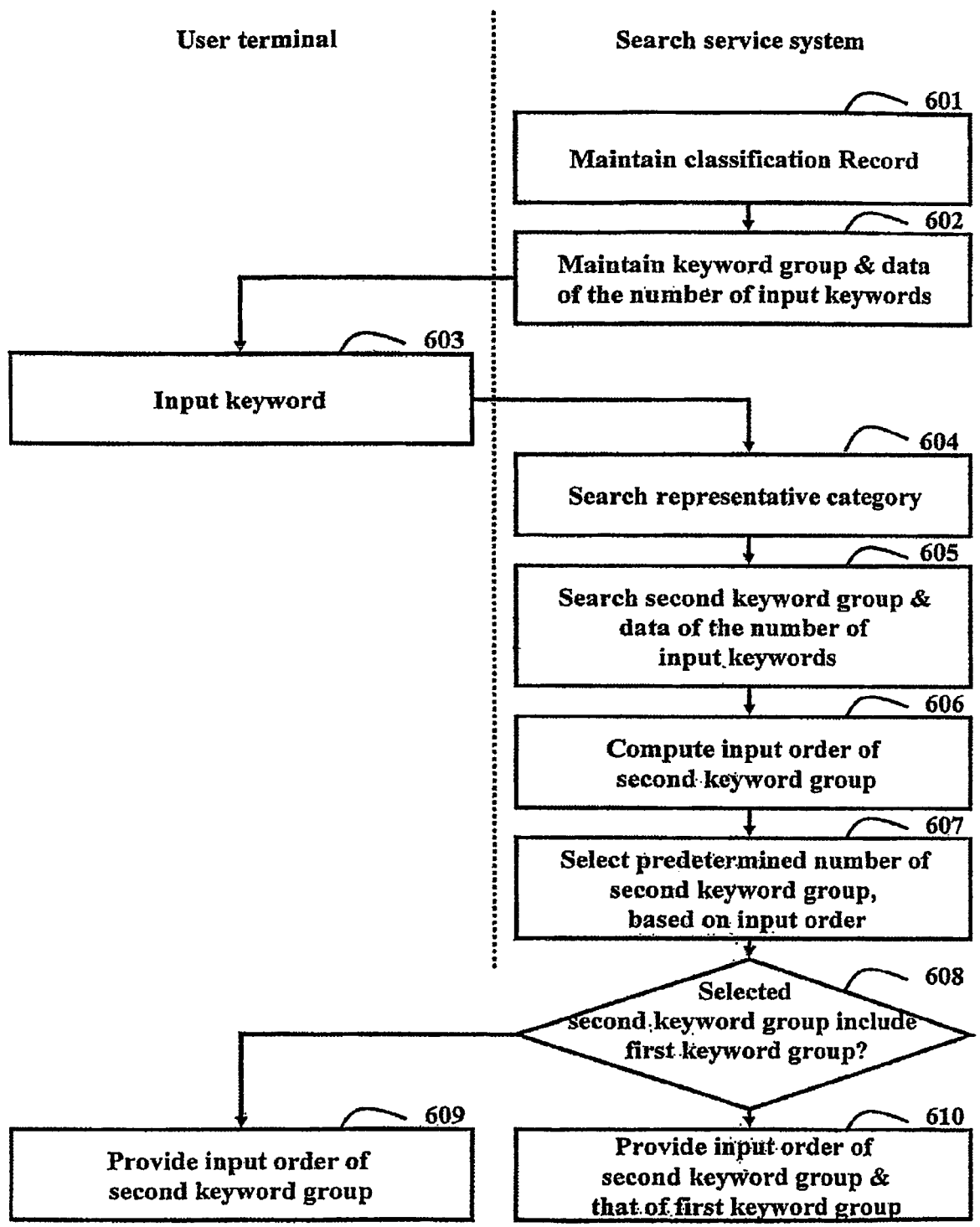
FIG. 6 is a flowchart illustrating a search service method according to another embodiment of the present invention.

Hereinafter, the method for providing a search service according to another embodiment of the present invention will be described. FIG. 6 is a flowchart illustrating the search service method according to the present embodiment. The search service method according to the present embodiment may be implemented by the search service system 200 as illustrated in FIG. 2.

In the step 601, the search service system 200 maintains at least one classification record, as illustrated in FIG. 4, in a predetermined keyword classification database. The classification record includes a representative category associated with a predetermined keyword group and a general category related thereto. The representative category or the general category maintained in the keyword classification database may be corrected according to a manager's instruction.

In the step 602, the search service system 200 maintains a predetermined keyword group and data indicative of the number of searched keywords corresponding thereto. The keyword group includes a representative keyword or a keyword having the same/similar meaning thereto. For example, the search service system 200 includes 'mcthemax (Korean)' and 'M.C The Max' in the same keyword group, and enables one keyword group to be formed by setting 'mcthemax (Korean)' as a representative keyword.

In the step 603, the search service system 200 receives a keyword from the user terminal 210a or 210b. At this time, in case that 'mc the max (Korean)' is received, there may be adopted variety of algorithms such as algorithm enabling 'mc the max (Korean)' to be regarded as same to 'mcthemax (Korean)' by deleting spaces between words.

In the step 604, the search service system 200 searches the category classification database for a representative category associated with a first keyword group including the keyword.

The search service system 200 searches the category classification database for a second keyword group associated with the searched representative category, in the step 604 and searches the keyword database for a second keyword group associated with the searched representative category and data indicative of the number of searched keywords corresponding to the second keyword group. Therefore, a keyword group associated with the representative category that is associated with the keyword searched by the user and data indicative of the number of searched keywords corresponding to the keyword group are searched.

In the step 606, the search service system 200 respectively computes a popularity rank of the second keyword group by using data indicative of the number of searched keywords thereof. Since at least one second keyword group includes the first keyword group, according to definition of teens used in the present specification, a popularity rank of the first keyword group is also automatically computed in the step 606.

In the step 607, the search service system 200 selects the predetermined number of second keyword groups based on the popularity rank. For example, the search service system 200 selects only second keyword groups whose popularity ranks are within top ten.

In case that the selected second keyword group includes the first keyword group, i.e. in case that the popularity rank of the first keyword group is within top ten, the search service system 200 provides the second popularity rank for the user terminal 210a or 210b, in association with the representative category and a representative keyword included in the second keyword group, in the step 609. A user is provided with popularity ranks by category as illustrated in FIG. 5c, by configuration like above.

In the meantime, in case that the selected second keyword group does not include the first keyword group, i.e. in case that a popularity rank of the first keyword group is out of top ten, the search service system 200 provides the user terminal 210a or 210b with the second popularity rank and the popularity rank of the first keyword respectively, in the step 610. The popularity rank of the first keyword group is provided in association with the representative category and a representative keyword included in the first keyword group, and the second popularity rank is provided in association with the representative category and a representative keyword included in the second keyword group. A user is provided with popularity ranks by category, as illustrated in FIG. 5d, by configuration like above.

According to another embodiment of the present invention, the search service system 200 may provide a user with only popularity rank corresponding to a first keyword group, in association with a representative category. In addition, according to another embodiment of the present invention, the search service system 200 may provide only popularity rank associated with the second keyword group whose popularity rank is within the predetermined number. At this time, in case that the first keyword group is not included in the second keyword group, a popularity rank associated with the first keyword group is not provided.

As aforementioned, the search service method according to the present embodiment adds up each of the number of different keywords which are searched by a user who intends to search for the same target, and computes a popularity rank by keyword groups, by adopting a concept of a keyword group. Thus, it is possible to compute a popularity rank corresponding to the user's intention. In addition, as aforementioned, the search service method according to the present embodiment is configured to adopt a concept of representative category/general category and correct the representative category or the general category according to social issues. Accordingly, a popularity rank in a category (i.e. a representative category) of a field intended by a user is computed.

Furthermore, according to another embodiment of the present invention, a popularity rank by representative category may be computed in association with a keyword, by maintaining a representative category/general category by keywords, without adopting a concept of a keyword group, and maintaining data indicative of the number of searched keywords thereby.

Furthermore, according to another embodiment of the present invention, popularity ranks by categories may be computed by maintaining keyword groups by categories, without dividing the categories into representative/general categories.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts.

Figure 7:
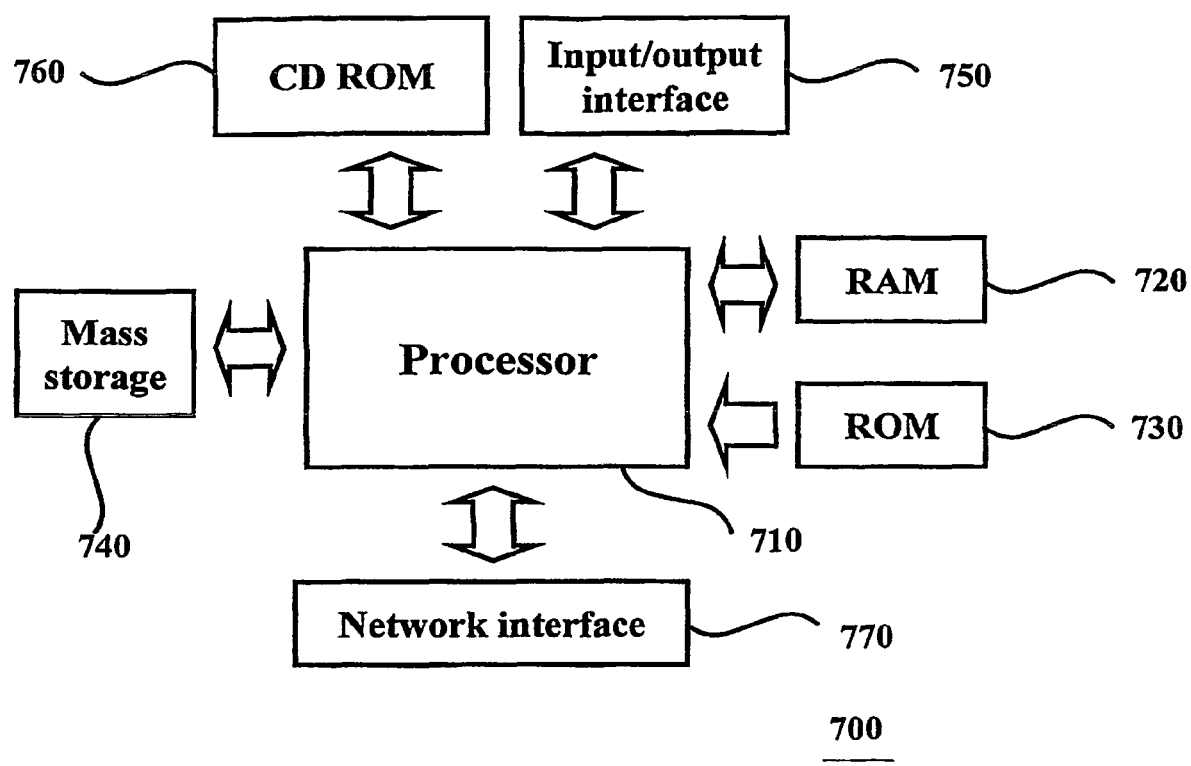
FIG. 7 is an internal block diagram illustrating a general-purpose computer which can be adopted in performing a search service method according to the present invention.

FIG. 7 is an internal block diagram of a general-purpose computer which can be more adopted in implementing the method for capturing of the multi-channel image signal according to the present invention.

The computer system 700 includes any number of processors 710 (also referred to as central processing units, or CPUs) that are coupled to storage devices including primary storage (typically a random access memory, or "RAM 720"), primary storage (typically a read only memory, or "ROM 730"). As is well known in the art, ROM 730 acts to transfer data and instructions uni-directionally to the CPU and RAM 720 is used typically to transfer data and instructions in a bi-directional manner. Both of these primary storage devices may include any suitable type of the computer-readable media described above. A mass storage device 740 is also coupled bi-directionally to CPU and provides additional data storage capacity and may include any of the computer-readable media described above. The mass storage device 740 may be used to store programs, data and the like and is typically a secondary storage medium such as a hard disk that is slower than primary storage. A specific mass storage device such as a CD-ROM 760 may also pass data uni-directionally to the CPU. Processor 710 is also coupled to an interface 750 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 710 optionally may be coupled to a computer or telecommunications network using a network connection as shown generally at network interface 770. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

INDUSTRIAL APPLICABILITY

According to the present invention, there is provided search service system and method which can provide a user with popularity ranks of keywords, by categories of keywords searched in the search service system.

Furthermore, according to the present invention, there is provided search service system and method which can further provide other keywords associated with a category associated with a keyword searched in the search service system, and a popularity rank of each of the keywords.

Furthermore, according to the present invention, there is provided search service system and method which, based on the latest interests of users who put keywords, can compute and provide popularity ranks of keywords, by classifying categories associated with the keyword into a representative category and a general category and by enabling the representative category and the general category to be changeable.

Furthermore, according to the present invention, there is provided search service system and method which can include keywords having similar or same meaning in one group of keywords, and in case that a searched keyword is included in the keyword group, compute and provide a popularity rank of keyword compatible with a user's intention by increasing the number of searched keywords associated with the keyword group.

What is claimed is:

1. A search service system comprising:
at least one memory having program instructions and databases, the databases comprising:
a category classification database including at least one representative category associated with one or more predetermined keyword groups, each of the predetermined keyword groups including one or more representative keywords and other keywords associated with the respective representative keywords;
a keyword database including at least one predetermined keyword group and data indicative of a number of searches made using one or more representative keywords or other keywords associated with the respective representative keywords, each of the representative keywords representing the other keywords associated with the representative keyword, which convey a same or similar meaning;
means for receiving a selection of a representative category associated with a predetermined keyword group from a manager wherein the selection is made to reflect current societal interest by the manager;
means for associating a representative keyword included in a first keyword group associated with a first representative category, with a second keyword group associated with a second representative category based on the selection of the manager;
means for receiving a search request from a user terminal through a communication network, the search request including a search keyword;
a first search unit for searching the category classification database for a representative category associated with the first keyword group including the search keyword, the first search unit determining the second keyword group related to the first keyword group by referring to the category classification database, wherein the second keyword group including the first keyword group;
a second search unit for searching the keyword database for the second keyword group and data indicative of a number of searches made using one or more representative keywords or other keywords included in the second keyword group;
an input order computing unit for computing input order of keywords included in the first keyword group by using the second keyword group to compute a popularity rank of the keywords based on data indicative of a number of searches made using keywords included in the first keyword group and the second keyword group;
means for providing the user terminal with information showing popularity of keywords together with keyword search results so that a display of the user terminal displays the information showing popularity together with the keyword search results, the information showing popularity being related to the search request based, at least in part, upon the data indicative of the respective number of searches made using the respective representative keywords or other keywords included in the second keyword group; and
means for updating the data indicative of a number of searches made using a representative keyword corresponding to the search keyword or other keywords of the second keyword group in response to the search request from the user terminal,
wherein the means for the updating the data adds a number of searches made using keywords represented by a first representative keyword to a number of searches made using the first representative keyword, where the first representative keyword and said keywords convey a same or similar meaning, wherein the first representative keyword is related to the search keyword.

2. The system of claim 1, wherein the information showing popularity of the searched keyword shows popularity ranks of the at least one keyword group associated with the searched representative category.

3. The system of claim 1, wherein the information showing popularity of the searched keyword shows a portion of the at least one keyword group associated with the searched representative category based upon the popularity of the at least one keyword group associated with the searched representative category.

4. The system of claim 1, wherein the information showing popularity of the searched keyword shows changes in the popularity of the searched keyword in association with the other keywords of the at least one keyword group associated with the searched representative category.

5. A search service method comprising:
maintaining at least one representative category associated with one or more predetermined keyword groups in a category classification database, each of the predetermined keyword groups including one or more representative keywords and other keywords associated with the respective representative keywords;
upon receipt of instructions from a manager wherein a selection is made to reflect current societal interest by the manager, associating a representative keyword included in a first keyword group associated with a first representative category, with a second keyword group associated with a second representative category based on the selection of the manager;
maintaining at least one predetermined keyword group and data indicative of a number of searches made using one or more representative keyword or other keywords associated with the respective representative keywords, in a keyword database, each of the representative keywords representing the other keywords associated with the respective representative keyword, which convey a same or similar meaning;
receiving a search request from a user terminal through a communication network, the search request including a search keyword;
searching the category classification database with a first search unit for a representative category associated with the first keyword group including the search keyword, the first search unit determines the second keyword group related to the first keyword group by referring to the category classification database, wherein the second keyword group includes the first keyword group;
searching the keyword database with a second search unit for the second keyword group data indicative of a number of searches made using one or more representative keywords or other keywords included in the second keyword group;
computing input order of keywords included in the first keyword group by using the second keyword group to compute a popularity rank of the keywords based on data indicative of a number of searches made using keywords included in the first keyword group and the second keyword group;
providing the user terminal with information showing popularity of keywords together with keyword search results so that a display of the user terminal displays the information showing popularity together with the keyword search results, the information showing popularity being related to the search request based, at least in part, upon the data indicative of the respective number of searches made using the respective representative keywords or other keywords included in the second keyword group; and
updating the data indicative of the number of searches made using a representative keyword corresponding to the search keyword or other keywords of the second keyword group in response to the search request from the user terminal,
wherein the updating the data adds a number of searches made using keywords represented by a first representative keyword to a number of searches made using the first representative keyword, where the first representative keyword and said keywords convey a same or similar meaning, wherein the first representative keyword is related to the search keyword.

6. The method of claim 5, wherein the information showing popularity of the searched keyword shows popularity ranks of the at least one keyword group associated with the searched representative category.

7. The method of claim 5, wherein the information showing popularity of the searched keyword shows a portion of the at least one keyword group associated with the searched representative category based upon the popularity of the at least one keyword group associated with the searched representative category.

8. The method of claim 5, wherein the information showing popularity of the searched keyword shows changes in the popularity of the searched keyword in association with the other keywords of the at least one keyword group associated with the searched representative category.

9. A non-transitory computer-readable storage medium comprising an executable program executed by one or more processors to perform the steps of:
maintaining at least one representative category associated with one or more predetermined keyword groups in a category classification database, each of the predetermined keyword groups including one or more representative keywords and other keywords associated with the respective representative keywords;
upon receipt of instructions from a manager wherein a selection is made to reflect current societal interest by the manager, associating a representative keyword included in a first keyword group associated with a first representative category, with a second keyword group associated with a second representative category based on the selection of the manager;
maintaining at least one predetermined keyword group and data indicative of a number of searches made using one or more representative keyword or other keywords associated with the respective representative keywords, in a keyword database, each of the representative keywords representing the other keywords associated with the respective representative keyword, which convey a same or similar meaning;
receiving a search request from a user terminal through a communication network, the search request including a search keyword;
searching the category classification database with a first search unit for a representative category associated with the first keyword group including the search keyword, the first search unit determines the second keyword group related to the first keyword group by referring to the category classification database, wherein the second keyword group includes the first keyword group;
searching the keyword database with a second search unit for the second keyword group data indicative of a number of searches made using one or more representative keywords or other keywords included in the second keyword group;
computing input order of keywords included in the first keyword group by using the second keyword group to compute a popularity rank of the keywords based on data indicative of a number of searches made using keywords included in the first keyword group and the second keyword group;

providing the user terminal with information showing popularity of keywords together with keyword search results so that a display of the user terminal displays the information showing popularity together with the keyword search results, the information showing popularity being related to the search request based, at least in part, upon the data indicative of the respective number of searches made using the respective representative keywords or other keywords included in the second keyword group; and updating the data indicative of the number of searches made using a representative keyword corresponding to the search keyword or other keywords of the second keyword group in response to the search request from the user terminal, wherein the updating the data adds a number of searches made using keywords represented by a first representative keyword to a number of searches made using the first representative keyword, where the first representative keyword and said keywords convey a same or similar meaning, wherein the first representative keyword is related to the search keyword.

10. The non-transitory computer-readable storage medium of claim 9, wherein the information showing popularity of the searched keyword shows popularity ranks of the at least one keyword group associated with the searched representative category.

11. The non-transitory computer-readable storage medium of claim 9, wherein the information showing popularity of the searched keyword shows a portion of the at least one keyword group associated with the searched representative category based upon the popularity of the at least one keyword group associated with the searched representative category.

* * * * *